United States Patent
Kim et al.

(10) Patent No.: US 9,502,174 B2
(45) Date of Patent: Nov. 22, 2016

(54) WIRELESS POWER TRANSMISSION APPARATUS AND WIRELESS POWER RECEPTION APPARATUS

(71) Applicant: SAMSUNG ELECTRONICS CO., LTD., Suwon-si (KR)

(72) Inventors: Ki Young Kim, Yongin-si (KR); Sang Wook Kwon, Seongnam-si (KR); Nam Yun Kim, Seoul (KR); Dong Zo Kim, Yongin-si (KR); Yun Kwon Park, Dongducheon-si (KR); Keum Su Song, Seoul (KR); Young Ho Ryu, Yongin-si (KR); Chang Wook Yoon, Seoul (KR); Jin Sung Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 545 days.

(21) Appl. No.: 14/147,012

(22) Filed: Jan. 3, 2014

(65) Prior Publication Data

US 2014/0265614 A1   Sep. 18, 2014

(30) Foreign Application Priority Data

Mar. 14, 2013   (KR) .......................... 10-2013-0027125

(51) Int. Cl.
*H01F 38/14*   (2006.01)
*B60L 11/18*   (2006.01)
*H02J 7/02*   (2016.01)
*H02J 3/18*   (2006.01)

(52) U.S. Cl.
CPC .............. *H01F 38/14* (2013.01); *B60L 11/182* (2013.01); *H02J 7/025* (2013.01)

(58) Field of Classification Search
CPC ........................................................ H02J 3/18
USPC ........................................................ 307/104
See application file for complete search history.

(56) References Cited

U.S. PATENT DOCUMENTS

2011/0241437 A1   10/2011   Kanno
2011/0248573 A1   10/2011   Kanno et al.

FOREIGN PATENT DOCUMENTS

| JP | 2007-165876 A | 6/2007 |
| JP | 2011-147126 A | 7/2011 |
| KR | 10-2010-0070690 A | 6/2010 |
| KR | 10-2011-0004322 A | 1/2011 |
| KR | 10-2011-0075105 A | 7/2011 |

*Primary Examiner* — Robert Deberadinis
(74) *Attorney, Agent, or Firm* — NSIP Law

(57) ABSTRACT

A wireless power transmission apparatus includes a resonance unit including resonators and configured to form a magnetic resonant coupling with another resonator, and a feeding unit configured to transmit alternating current (AC) power to one of the resonators. The wireless power transmission apparatus further includes a controller configured to determine a value of a capacitor connected to one of the resonators, based on a magnitude of a magnetic field formed by the resonance unit.

20 Claims, 17 Drawing Sheets

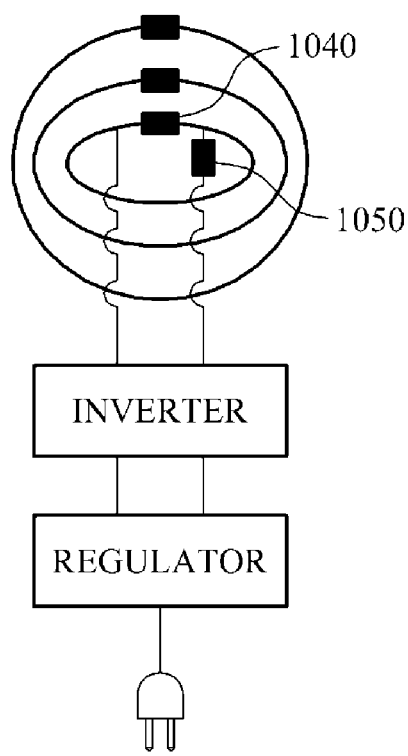

WIRELESS POWER TRANSMISSION APPARATUS AND WIRELESS POWER RECEPTION APPARATUS

CROSS-REFERENCE TO RELATED APPLICATION

This application claims the benefit under 35 USC 119(a) of Korean Patent Application No. 10-2013-0027125, filed on Mar. 14, 2013, in the Korean Intellectual Property Office, the entire disclosure of which is incorporated herein by reference for all purposes.

BACKGROUND

1. Field

The following description relates to a wireless power transmission apparatus and a wireless power reception apparatus.

2. Description of Related Art

Research on wireless power transmission has been started to overcome an increase in inconveniences of wired power supplies, and the limited capacity of conventional batteries, due to a rapid increase in various electronic devices including electric vehicles and mobile devices. One of wireless power transmission technologies uses resonance characteristics of radio frequency (RF) devices. A wireless power transmission system using resonance characteristics may include a source device configured to supply power, and a target device configured to receive the supplied power.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmission apparatus includes a resonance unit including resonators and configured to form a magnetic resonant coupling with another resonator, and a feeding unit configured to transmit alternating current (AC) power to one of the resonators. The wireless power transmission apparatus further includes a controller configured to determine a value of a capacitor connected to one of the resonators, based on a magnitude of a magnetic field formed by the resonance unit.

Each of the resonators may be in a form of a loop, and may include a variable capacitor of which a value is adjusted to focus the magnetic field on an internal portion of the resonance unit.

The resonators may have different sizes and may be classified into an internal resonator and an external resonator on a plane, based on the sizes.

The resonators may have different sizes and may be classified into an internal resonator, an intermediate resonator, and an external resonator on a plane, based on the sizes.

Each of the resonators may be in a form of a loop, the form of the loop including a form of a polygon or a form of a circle.

Each of at least one of the resonators may include a variable capacitor, and the controller may be configured to determine a value of the variable capacitor of each of the at least one of the resonators, based on the magnitude of the magnetic field formed by the resonance unit.

The capacitor may be connected in series between the feeding unit and at least one of the resonators.

The capacitor may be connected in parallel between the feeding unit and at least one of the resonators.

The apparatus may further include switches configured to connect the respective resonators and the feeding unit. The controller may be further configured to determine a switch to be used to connect the feeding unit and a respective one of the resonators, among the switches, based on the magnitude of the magnetic field formed by the resonance unit.

The feeding unit may include a regulator configured to adjust a voltage level of power to be supplied, based on a charging capacity of a wireless power reception apparatus, and an inverter configured to convert the power of the adjusted voltage level to the AC power, using a resonant frequency of the resonators.

The controller may be further configured to adjust a distance between the resonators based on the magnitude of the magnetic field formed by the resonance unit, to focus the magnetic field on an internal portion of the resonance unit.

In another general aspect, a wireless power reception apparatus includes a resonance unit including resonators and configured to form a magnetic coupling with another resonator, and a feeding unit configured to receive alternating current (AC) power from one of the resonators. The wireless power reception apparatus further includes a controller configured to determine a value of a capacitor connected to one of the resonators, based on a magnitude of a magnetic field formed by the resonance unit.

The feeding unit may include a rectifier configured to rectify the AC power into direct current (DC) power, and a DC-to-DC (DC/DC) converter configured to convert a voltage level of the DC power into a rated voltage level of a load.

In still another general aspect, an apparatus includes resonators configured to form a resonant coupling with another resonator, and a controller configured to determine a value of a capacitor connected to one of the resonators, based on a magnetic field generated by the resonators.

The controller may be configured to determine the value of the capacitor so that a magnitude of the magnetic field increases at a center of the resonators.

The controller may be further configured to determine a distance between the resonators so that a magnitude of the magnetic field increases at a center of the resonators.

Other features and aspects will be apparent from the following detailed description, the drawings, and the claims.

BRIEF DESCRIPTION OF THE DRAWINGS

FIGS. 10A through 10D are diagrams illustrating examples of various connection structures between a capacitor and a resonator of a wireless power transmission apparatus.

Figure 1:
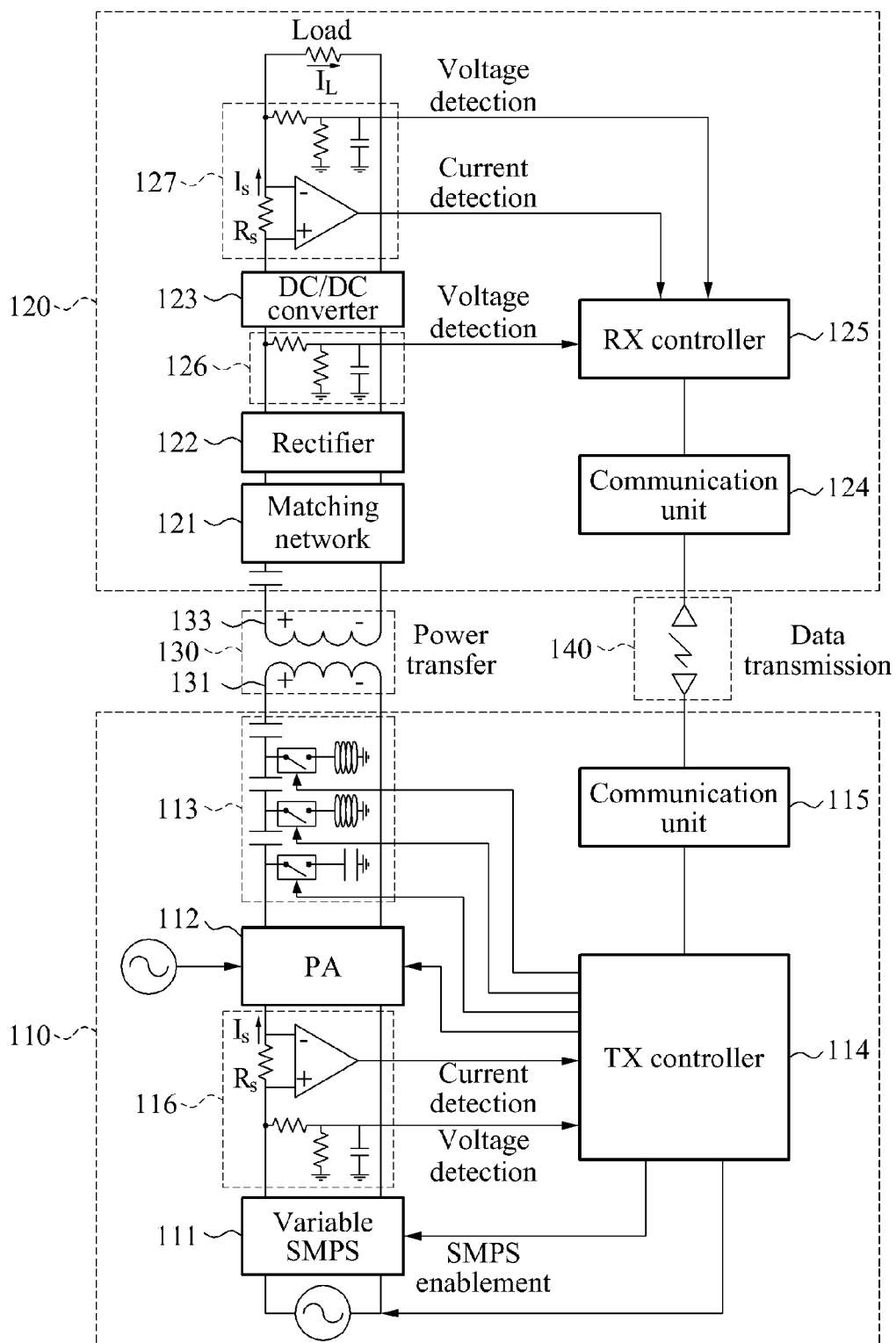
FIG. 1 is a diagram illustrating an example of a wireless power transmission system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Similar to a wireless charging system of an electric vehicle, using wireless power transmission, in an example in which power greater than hundreds of watts and tens of kilowatts (kW) is transferred using a magnetic field, a consideration of effects of the magnetic field on a human body and a degree of interference in other devices may be needed. For example, when an electric vehicle is being charged, a magnitude of a magnetic field generated outside the electric vehicle is to meet safety standards in relation to such effects of the magnetic field on a human body.

As an example of satisfying such safety standards, a scheme of focusing a magnetic field on a center of a resonator may be employed. In an example of a resonator in a form of a loop, a magnitude of a magnetic field may be great at a location relatively close to the resonator, and the magnitude of the magnetic field may gradually decrease as the location moves closer to an internal portion of the resonator. Accordingly, in wireless power transmission, the magnitude of the magnetic field may be relatively strong in an external field of the resonator, when compared to the internal portion of the resonator.

In order to reduce a magnitude of a magnetic field generated outside a resonator in wireless power transmission, a shielding material may be used, or an auxiliary loop may be installed. In this example, a total cost of manufacturing a system may increase. As an example of readily resolving a difference in a magnitude of a magnetic field for each field and an issue of a cost for implementation, the scheme of focusing a magnetic field on a center of a resonator may be employed.

FIG. 1 illustrates an example of a wireless power transmission system. Referring to FIG. 1, the wireless power transmission system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes a variable switching mode power supply (SMPS) 111, a power amplifier 112, a matching network 113, a transmission (TX) controller 114, a communication unit 115, a power detector 116, and a source resonator 131. The target device 120 includes a matching network 121, a rectifier 122, a direct current-to-direct current (DC/DC) converter 123, a communication unit 124, a reception (RX) controller 125, a power detector 127, and a target resonator 133.

The variable SMPS 111 generates a DC voltage by switching an alternating current (AC) voltage having a frequency of tens of hertz (Hz) output from a power supply. The variable SMPS 111 may output a DC voltage having a predetermined level, or may output a DC voltage having an adjustable level by the TX controller 114.

The variable SMPS 111 may control supplied voltage based on a level of power output from the PA 112 so that the PA 112 may be operated in a saturation region with high efficiency at all times, and may enable a maximum efficiency to be maintained at all levels of the output power. The PA 112 may have class-E features.

For example, when a common SMPS is used instead of the variable SMPS 111, a variable DC-to-DC (DC/DC) converter needs to be additionally used. In this example, the common SMPS and the variable DC/DC converter may control supplied voltage based on the level of the power output from the PA 112 so that the PA 112 may be operated in the saturation region with high efficiency at all times, and may enable the maximum efficiency to be maintained at all levels of the output power.

The power detector 116 detects an output current and an output voltage of the variable SMPS 111, and provides, to the TX controller 114, information on the detected current and the detected voltage. Additionally, the power detector 116 detects an input current and an input voltage of the power amplifier 112.

The power amplifier 112 generates a power by converting the DC voltage output from the variable SMPS 111 to an AC voltage using a switching pulse signal having a frequency of a few kilohertz (kHz) to tens of megahertz (MHz). In other words, the power amplifier 112 converts a DC voltage supplied to a power amplifier to an AC voltage using a reference resonance frequency $F_{Ref}$, and generates a communication power to be used for communication, or a charging power to be used for charging that may be used in a plurality of target devices. The communication power may be, for example, a low power of 0.1 to 1 milliwatts (mW) that may be used by a target device to perform communication, and the charging power may be, for example, a high power of 1 mW to 200 Watts (W) that may be consumed by a device load of a target device. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

When a large amount of power corresponding to a few kW to tens of kW is to be transmitted using a resonant frequency in a band of tens of kilohertz (kHz) to hundreds of kHz, the PA 112 may not be used. Alternatively, power may be transferred to the source resonator 131 from the variable SMPS 111 or a high-power power supply. In this example, an inverter may be used in lieu of the PA 112. The inverter may convert a DC power supplied from the high-power power supply into an AC power. The inverter may convert the power by converting a DC voltage of a predetermined level into an AC voltage, using a switching pulse signal in a band of tens of kHz to hundreds of kHz. For example, the inverter may convert the DC voltage of the predetermined level into the AC voltage, using a resonant frequency in a band of tens of kHz to hundreds of kHz of the source resonator 131.

In this description, the term "reference resonance frequency" refers to a resonance frequency that is nominally used by the source device 110, and the term "tracking frequency" refers to a resonance frequency used by the source device 110 that has been adjusted based on a predetermined scheme.

The TX controller 114 may detect a reflected wave of the communication power or a reflected wave of the charging power, and may detect mismatching between the target resonator 133 and the source resonator 131 based on the detected reflected wave. The TX controller 114 may detect the mismatching by detecting an envelope of the reflected wave, or by detecting an amount of a power of the reflected wave.

Under the control of the TX controller 114, the matching network 113 compensates for impedance mismatching between the source resonator 131 and the target resonator 133 so that the source resonator 131 and the target resonator 133 are optimally-matched. The matching network 113 includes combinations of a capacitor and an inductor that are connected to the TX controller 114 through a switch, which is under the control of the TX controller 114. When a large amount of power is to be transmitted using a resonant frequency in a band of tens of kHz to hundreds of kHz, the matching network 113 may be omitted from the source device 110 since an effect of the matching network 113 may be reduced when transmitting the large amount of the power.

The TX controller 114 may calculate a voltage standing wave ratio (VSWR) based on a voltage level of the reflected wave and a level of an output voltage of the source resonator 131 or the power amplifier 112. When the VSWR is greater than a predetermined value, the TX controller 114 detects the mismatching. In this example, the TX controller 114 calculates a power transmission efficiency of each of N predetermined tracking frequencies, determines a tracking frequency $F_{Best}$ having the best power transmission efficiency among the N predetermined tracking frequencies, and changes the reference resonance frequency $F_{Ref}$ to the tracking frequency $F_{Best}$.

Also, the TX controller 114 may control a frequency of the switching pulse signal used by the power amplifier 112. By controlling the switching pulse signal used by the power amplifier 112, the TX controller 114 may generate a modulation signal to be transmitted to the target device 120. In other words, the communication unit 115 may transmit various messages to the target device 120 via in-band communication. Additionally, the TX controller 114 may detect a reflected wave, and may demodulate a signal received from the target device 120 through an envelope of the reflected wave.

The TX controller 114 may generate a modulation signal for in-band communication using various schemes. To generate a modulation signal, the TX controller 114 may turn on or off the switching pulse signal used by the power amplifier 112, or may perform delta-sigma modulation. Additionally, the TX controller 114 may generate a pulse-width modulation (PWM) signal having a predetermined envelope.

The TX controller 114 may determine initial wireless power that is to be transmitted to the target device 120 based on a change in a temperature of the source device 110, a battery state of the target device 120, a change in an amount of power received at the target device 120, and/or a change in a temperature of the target device 120. The source device 110 may further include a temperature measurement sensor (not illustrated) configured to detect the change in the temperature. The source device 110 may receive, from the target device 120, information of the battery state of the target device 120, the change in the amount of the power received at the target device 120, and/or the change in the temperature of the target device 120. The source device 110 may detect the change in the temperature of the target device 120 based on the information received from the target device 120.

The TX controller 114 may adjust voltage supplied to the PA 112, using a lookup table. The lookup table may be used to store an amount of the voltage to be adjusted based on the change in the temperature of the source device 110. For example, when the temperature of the source device 110 rises, the TX controller 114 may lower the amount of the voltage to be supplied to the PA 112.

The communication unit 115 may perform out-of-band communication using a communication channel. The communication unit 115 may include a communication module, such as a ZigBee module, a Bluetooth module, or any other communication module, that the communication unit 115 may use to perform the out-of-band communication. The communication unit 115 may transmit or receive data 140 to or from the target device 120 via the out-of-band communication.

The source resonator 131 transfers electromagnetic energy 130, such as the communication power or the charging power, to the target resonator 133 via a magnetic coupling with the target resonator 133. The source resonator 131 may include a superconductive material. In addition, although not shown in FIG. 1, the source resonator 131 may be disposed in a container including a refrigerant so as to maintain a superconductive property of the source resonator 131. A cooler may convert a heated refrigerant from a gaseous state to a liquid state.

The target resonator 133 receives the electromagnetic energy 130, such as the communication power or the charging power, from the source resonator 131 via a magnetic coupling with the source resonator 131. Additionally, the target resonator 133 receives various messages from the source device 110 via the in-band communication. The target resonator 133 may include a superconductive material. In addition, although not shown in FIG. 1, the target resonator 133 may be disposed in a container including a refrigerant so as to maintain a superconductive property of the target resonator 133.

The target resonator 133 may receive the initial wireless power that is determined based on the change in the temperature of the source device 110, the battery state of the target device 120, the change in the amount of the power received at the target device 120, and/or the change in the temperature of the target device 120.

The matching network 121 matches an input impedance viewed from the source device 110 to an output impedance viewed from a load. The matching network 121 may be configured with a combination of a capacitor and an inductor.

The rectifier 122 generates a DC voltage by rectifying an AC voltage received by the target resonator 133.

The DC/DC converter 123 adjusts a level of the DC voltage output from the rectifier 122 based on a voltage rating of the load. For example, the DC/DC converter 123 may adjust the level of the DC voltage output from the rectifier 122 to a level in a range from 3 volts (V) to 10 V.

The power detector 127 detects a voltage (e.g., $V_{dd}$) of an input terminal 126 of the DC/DC converter 123, and a current and a voltage of an output terminal of the DC/DC converter 123. The power detector 127 outputs the detected voltage of the input terminal 126, and the detected current and the detected voltage of the output terminal, to the RX controller 125. The RX controller 125 uses the detected voltage of the input terminal 126 to compute a transmission efficiency of power received from the source device 110. Additionally, the RX controller 125 uses the detected current and the detected voltage of the output terminal to compute an amount of power transferred to the load. The TX controller 114 of the source device 110 determines an amount of power that needs to be transmitted by the source device 110 based on an amount of power required by the load and the amount of power transferred to the load. When the communication unit 124 transfers an amount of power of the output terminal (e.g., the computed amount of power transferred to the load) to the source device 110, the TX controller 114 of the source device 110 may compute the amount of power that needs to be transmitted by the source device 110.

The communication unit 124 may perform in-band communication for transmitting or receiving data using a resonance frequency by demodulating a received signal obtained by detecting a signal between the target resonator 133 and the rectifier 122, or by detecting an output signal of the rectifier 122. In other words, the RX controller 125 may demodulate a message received via the in-band communication.

Additionally, the RX controller 125 may adjust an impedance of the target resonator 133 to modulate a signal to be transmitted to the source device 110. For example, the RX controller 125 may increase the impedance of the target resonator so that a reflected wave will be detected by the TX controller 114 of the source device 110. In this example, depending on whether the reflected wave is detected, the TX controller 114 of the source device 110 will detect a binary number "0" or "1".

The communication unit 124 may transmit, to the source device 110, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The communication unit 124 may also perform an out-of-band communication using a communication channel. The communication unit 124 may include a communication module, such as a ZigBee module, a Bluetooth module, or any other communication module known in the art, that the communication unit 124 may use to transmit or receive data 140 to or from the source device 110 via the out-of-band communication.

The communication unit 124 may receive a wake-up request message from the source device 110, detect an amount of a power received by the target resonator, and transmit, to the source device 110, information about the amount of the power received by the target resonator. In this example, the information about the amount of the power received by the target resonator may correspond to an input voltage value and an input current value of the rectifier 122, an output voltage value and an output current value of the rectifier 122, or an output voltage value and an output current value of the DC/DC converter 123.

Figure 2:
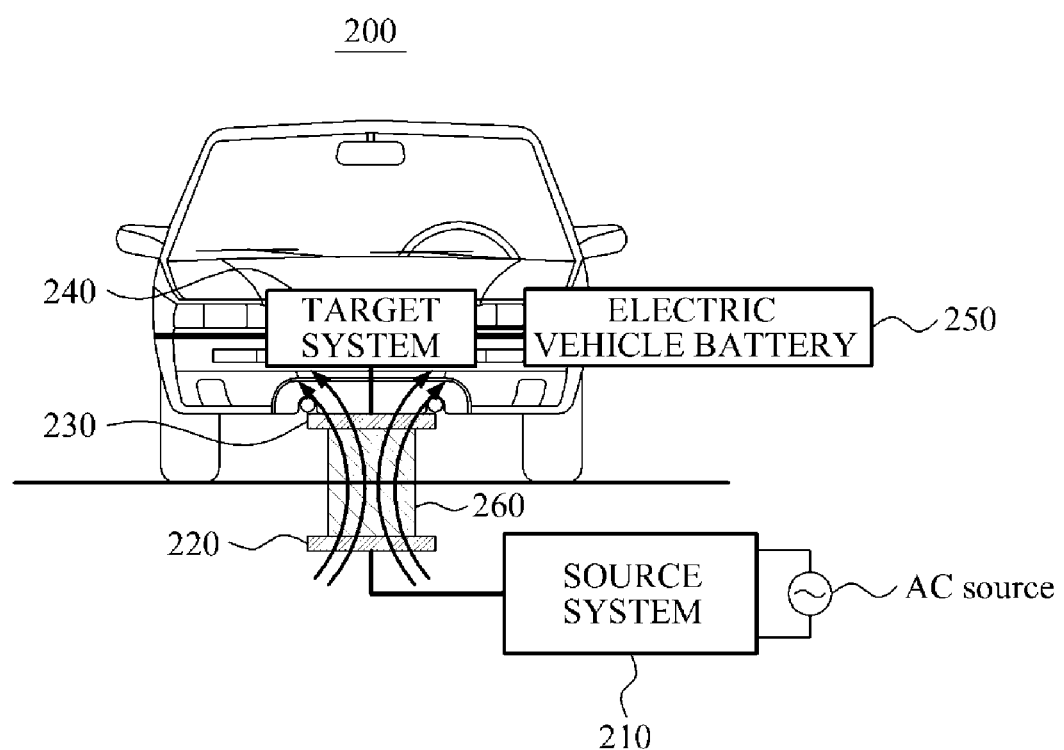
FIG. 2 is a diagram illustrating an example of an electric vehicle charging system.

FIG. 2 illustrates an example of an electric vehicle charging system. Referring to FIG. 2, an electric vehicle charging system 200 includes a source system 210, a source resonator 220, a target resonator 230, a target system 240, and an electric vehicle battery 250.

In one example, the electric vehicle charging system 200 includes a structure similar to the structure of the wireless power transmission system of FIG. 1. The source system 210 and the source resonator 220 in the electric vehicle charging system 200 operate as a source. The target resonator 230 and the target system 240 in the electric vehicle charging system 200 operate as a target.

In one example, the source system 210 includes an alternating current-to-direct current (AC/DC) converter, a power detector, a power converter, a control and communication (control/communication) unit similar to those of the source device 110 of FIG. 1. In one example, the target system 240 includes a rectifier, a DC-to-DC (DC/DC) converter, a switch, a charging unit, and a control/communication unit similar to those of the target device 120 of FIG. 1. The electric vehicle battery 250 is charged by the target system 240. The electric vehicle charging system 200 may use a resonant frequency in a band of a few kHz to tens of MHz.

The source system 210 generates power based on a type of the vehicle being charged, a capacity of the electric vehicle battery 250, and a charging state of the electric vehicle battery 250, and wirelessly transmits the generated power to the target system 240 via a magnetic coupling between the source resonator 220 and the target resonator 230.

The source system 210 may control an alignment of the source resonator 220 and the target resonator 230. For example, when the source resonator 220 and the target resonator 230 are not aligned, the controller of the source system 210 may transmit a message to the target system 240 to control the alignment of the source resonator 220 and the target resonator 230.

For example, when the target resonator 230 is not located in a position enabling maximum magnetic coupling, the source resonator 220 and the target resonator 230 are not properly aligned. When a vehicle does not stop at a proper position to accurately align the source resonator 220 and the target resonator 230, the source system 210 may instruct a position of the vehicle to be adjusted to control the source resonator 220 and the target resonator 230 to be aligned. However, this is just an example, and other methods of aligning the source resonator 220 and the target resonator 230 may be used.

The source system 210 and the target system 240 may transmit or receive an ID of a vehicle and exchange various messages by performing communication with each other.

The description of FIG. 1 is also applicable to the electric vehicle charging system 200. However, the electric vehicle charging system 200 may use a resonant frequency in a band of a few kHz to tens of MHz, and may wirelessly transmit power that is equal to or higher than tens of watts to charge the electric vehicle battery 250.

Figure 3:
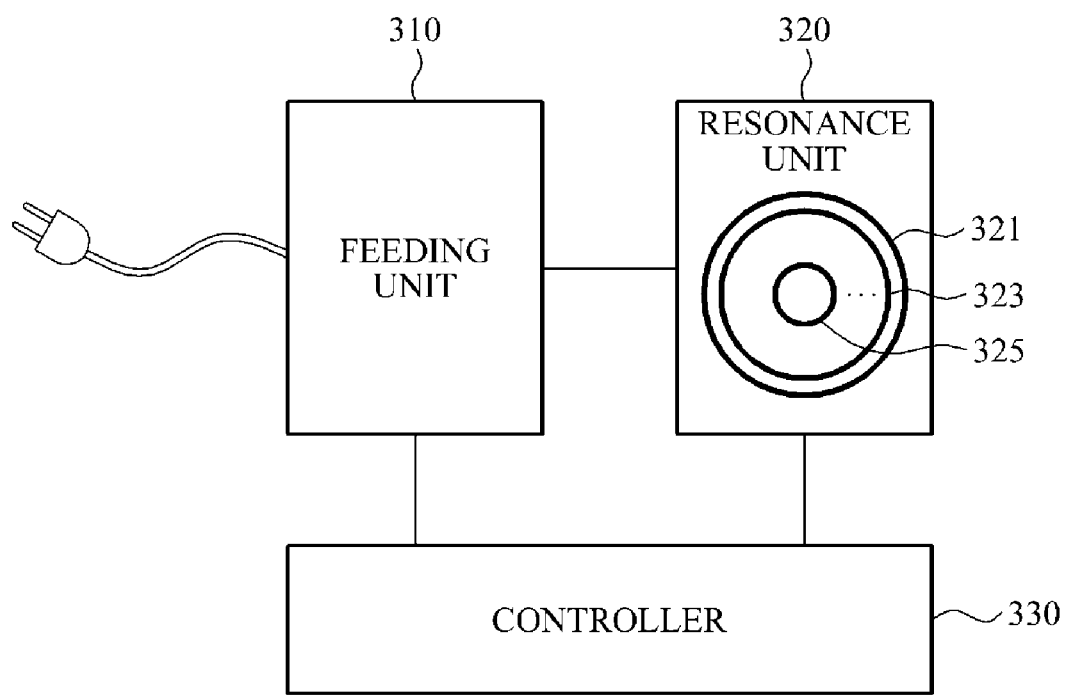
FIG. 3 is a diagram illustrating an example of a wireless power transmission apparatus.

FIG. 3 illustrates an example of a wireless power transmission apparatus. Referring to FIG. 3, the wireless power transmission apparatus includes a feeding unit 310, a resonance unit 320, and a controller 330.

The resonance unit 320 includes resonators 321, 323, and 325. The resonance unit 320 forms a magnetic resonant coupling with a target resonator. When a resonant frequency of the resonators 321, 323, and 325 matches a resonant frequency of the target resonator, the magnetic resonant coupling may occur. The target resonator may include a plurality of resonators.

As another example, when a resonant frequency of at least one of the resonators 321, 323, and 325 matches the resonant frequency of the target resonators, the magnetic resonant coupling may occur. As used herein, the magnetic resonant coupling may have the same meaning as a mutual resonance. As still another example, when a portion of a resonant frequency band of the resonators 321, 323, and 325 matches a portion of a resonant frequency band of the target resonator, a magnetic resonant coupling may occur.

Each of the resonators 321, 323, and 325 includes a resonant structure in a form of a loop. For example, each of the plurality of resonators 321, 323, and 325 may include a variable capacitor of which a capacitance value may be adjusted to focus a magnetic field generated by the resonators 321, 323, and 325 on an internal portion of the resonance unit 320.

The resonators 321, 323, and 325 may have different sizes such that the resonators 321, 323, and 325 may be classified into an internal resonator and an external resonator on an identical plane, based on the sizes. For example, the resonator 321 may be classified as an external resonator, when compared to the resonator 323, and the resonator 323 may be classified as an internal resonator. The resonator 321 and the resonator 323 may be positioned on an identical plane. For example, in a system expressed by x, y, and z axes, the resonator 321 and the resonator 323 may be positioned on an identical plane corresponding to an xy plane, a yz plane, or a zx plane. The resonator 321 and the resonator 323 may be positioned to form an identical angle with other generable planes.

In addition, the resonator 323 may be classified as an external resonator, when compared to the resonator 325, and the resonator 325 may be classified as an internal resonator. Furthermore, the resonator 321 may be classified as an external resonator, when compared to the resonator 325, and the resonator 325 may be classified as an internal resonator.

The resonators 321, 323, and 325 may have different sizes such that the resonators 321, 323, and 325 may be classified into an internal resonator, an intermediate resonator, and an external resonator on an identical plane, based on the sizes. For example, the resonator 321 may be classified as an external resonator, the resonator 323 may be classified as an intermediate resonator, and the resonator 325 may be classified as an internal resonator. As another example, when the resonance unit 320 includes at least four resonators, a resonator of a greatest size may be classified as an external resonator, a resonator of a smallest size may be classified as an internal resonator, and remaining resonators may be classified as intermediate resonators.

Each of the resonators 321, 323, and 325 includes the resonant structure in the form of the loop, and the form of the loop may include a form of a polygon or a form of a circle. The resonators 321, 323, and 325 may have identical forms or different forms.

At least one of the resonators 321, 323, and 325 may include at least one capacitor, respectively. Accordingly, a magnitude of the magnetic field generated by the resonator 321, the resonator 323, and the resonator 325 may be adjusted. As another example, by adjusting a capacitance value of the included capacitor, the magnitude of the magnetic field generated by the resonator 321, the resonator 323, and the resonator 325 may be adjusted.

The feeding unit 310 provides AC power to one of the of resonators 321, 323, and 325. The feeding unit 310 provides power to be transmitted from the resonators 321, 323, and 325 to the target resonator. The feeding unit 310 converts power using a resonant frequency at which a magnetic resonant coupling is formed between the resonance unit 320 and the target resonator, and provides the AC power to the resonators 321, 323, and 325. The feeding unit 310 may be connected to one of the resonators 321, 323, and 325 to provide the AC power to the connected one of the resonators 321, 323, and 325.

The controller 330 may determine (i.e., adjust) a capacitance value of the at least one capacitor connected to the at least one of the resonators 321, 323, and 325, based on a magnitude of a magnetic field formed by the resonance unit 320. For example, the controller 330 may determine the capacitance value of the at least one capacitor connected to the at least one of the resonators 321, 323, and 325 so that the magnitude of the magnetic field may increase at a center of the resonance unit 320. When the magnetic field is focused on the center of the resonance unit 320, a magnitude of a magnetic field generated outside the resonance unit 320 may decrease. Accordingly, an effect of the magnetic field on a human positioned close to the resonance unit 320 may be reduced. In addition, a transmission efficiency of power to be transferred to a wireless power reception apparatus may increase.

The controller 330 may determine a resonator to be connected to the feeding unit 310, among the resonators 321, 323, and 325, so that the magnitude of the magnetic field may increase at the center of the resonance unit 320. The controller 330 may connect at least one capacitor in series between the feeding unit 310 and at least one of the resonators 321, 323, and 325. The controller 330 may connect at least one capacitor in parallel between the feeding unit 310 and at least one of the resonators 321, 323, and 325. The controller 330 may connect a plurality of capacitors in series and parallel between the feeding unit 310 and at least one of the resonators 321, 323, and 325. Although three resonators 321, 323, and 325 are used in the example of FIG. 3, the resonance unit 320 may include at least three resonators.

Figure 4:
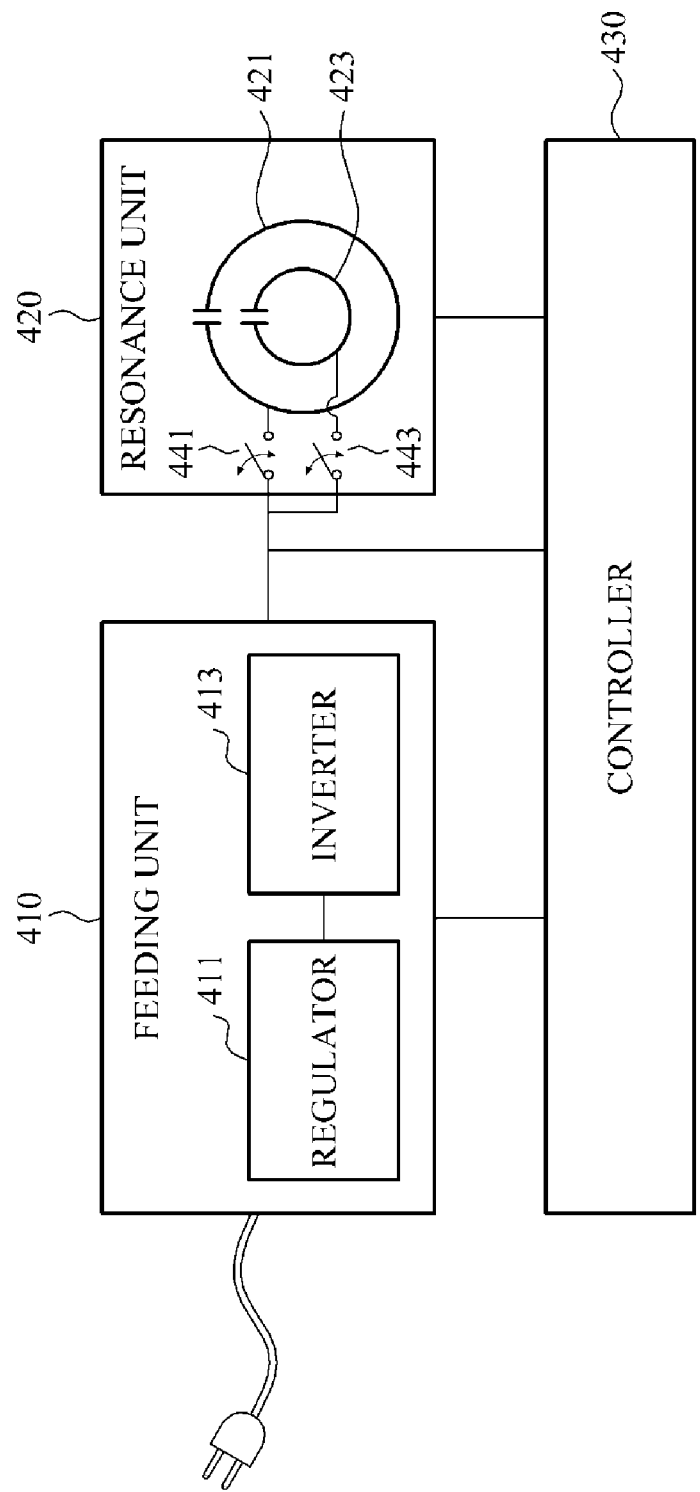
FIG. 4 is a diagram illustrating another example of a wireless power transmission apparatus.

FIG. 4 illustrates another example of a wireless power transmission apparatus. Referring to FIG. 4, the wireless power transmission apparatus includes a feeding unit 410, a resonance unit 420, and a controller 430.

The feeding unit 410 provides AC power to one of resonators 421 and 423 of the resonance unit 420. The feeding unit 410 provides power to be transmitted from the resonators 421 and 423 to a target resonator. The feeding unit 410 converts power to the AC power, using a resonant frequency at which a magnetic resonant coupling is formed between the resonance unit 420 and the target resonator, and provides the AC power to the resonators 421 and 423. The feeding unit 410 may be connected to one of the resonators 421 and 423 to provide the AC power to the connected one of the resonators 421 and 423.

The feeding unit 410 includes a regulator 411 and an inverter 413. The regulator 411 adjusts a voltage level of power to be supplied, based on a charging capacity of a wireless power reception apparatus. The wireless power transmission apparatus may receive, from the wireless power reception apparatus, information of a charging state of the wireless power reception apparatus that indicates a current amount charged of a full charging capacity and the charging capacity. The wireless power transmission apparatus may communicate with the wireless power reception apparatus, using an in-band communication scheme and/or an out-band communication scheme. The in-band communication scheme may utilize a frequency identical to the resonant frequency at which the magnetic resonant coupling is formed between the resonance unit 420 and the target resonator. The out-band communication scheme may utilize a communication frequency used in radio frequency (RF) communication.

The regulator 411 converts the voltage level of the power to be supplied in a wireless or wired manner into a voltage level requested by the wireless power reception apparatus, based on the information of the charging state of the wireless power reception apparatus. For example, the regulator 411 may be implemented by a buck converter or a booster converter. As the wireless power reception apparatus is charged, the voltage level requested by the wireless reception apparatus may be changed. The regulator 411 adaptively converts the voltage level of the power to be supplied into the voltage level requested by the wireless power reception apparatus.

The inverter 413 converts the power of the voltage level adjusted by the regulator 411 to AC power, using a resonant frequency of the resonators 421 and 423.

The resonance unit 420 includes the resonators 421 and 423. The resonance unit 420 forms the magnetic resonant coupling with the target resonator. When the resonant frequency of the resonators 421 and 423 matches a resonant frequency of the target resonator, the magnetic resonant coupling may occur. The target resonator may include a plurality of resonators.

Each of the resonators 421 and 423 includes a resonant structure in a form of a loop. For example, each of the resonators 421 and 423 may include a variable capacitor of which a capacitance value may be adjusted to focus a magnetic field generated by the resonators 421 and 423 on an internal portion of the resonance unit 420.

The resonators 421 and 423 may have different sizes such that the resonators 421 and 423 may be classified into an internal resonator and an external resonator on an identical plane, based on the sizes. For example, the resonator 421 may be classified as an external resonator, when compared to the resonator 423, and the resonator 423 may be classified as an internal resonator. The resonator 421 and the resonator 423 may be positioned on an identical plane. For example, in a system expressed by x, y, and z axes, the resonator 421 and the resonator 423 may be positioned on an identical plane corresponding to an xy plane, a yz plane, or a zx plane. The resonator 421 and the resonator 423 may be positioned to form an identical angle with other generable planes.

Each of the resonators 421 and 423 includes the resonant structure in the form of the loop, and the form of the loop may include a form of a polygon or a form of a circle. The resonators 421 and 423 may have identical forms or different forms.

At least one of the resonators 421 and 423 may include at least one capacitor, respectively. Accordingly, a magnitude of the magnetic field generated by the resonator 421 and the resonator 423 may be adjusted. As another example, by adjusting a capacitance value of the included capacitor, the magnitude of the magnetic field generated by the resonator 421 and the resonator 423 may be adjusted.

The resonance unit 420 includes the switches 441 and 443. The switches 441 and 443 connect the resonators 421 and 423, respectively, to the feeding unit 410. The controller 430 may determine a switch to be used to connect the feeding unit 410 and a respective one of the resonators 421 and 423, among the switches 441 and 443, based on the magnitude of the magnetic field formed by the resonance unit 420. For example, the controller 430 may control an operation of the switch 443 to connect the resonator 423 to the feeding unit 410, so that the magnitude of the magnetic field in the internal portion of the resonance unit 420 may increase. As another example, the controller 430 may control an operation of the switch 441 to connect the resonator 421 to the feeding unit 410, so that the magnitude of the magnetic field between the resonator 423 and the resonator 421 may increase.

The controller 430 may determine (i.e., adjust) the capacitance value of the at least one capacitor connected to the at least one of the resonators 421 and 423, based on the magnitude of the magnetic field formed by the resonance unit 420. For example, the controller 430 may determine the capacitance value of the at least one capacitor connected to the at least one of the plurality of resonators 421 and 423 so that the magnitude of the magnetic field may increase at a center of the resonance unit 420.

The controller 430 may adjust a distance between the resonators 421 and 423 based on the magnitude of the magnetic field formed by the resonance unit 420, to focus the magnetic field on the internal portion of the resonance unit 420. For example, the controller 430 may adjust a position of the resonator 421 or the resonator 423, using a moving pole connected to each of the resonator 421 and the resonator 423, thereby adjusting the distance between the resonator 421 and the resonator 423. Although the switches 441 and 443 are included in the resonance unit 420 in the example of FIG. 4, the switches 441 and 443 may be included in the wireless power transmission apparatus as separate elements from the resonance unit 420.

Figure 5:
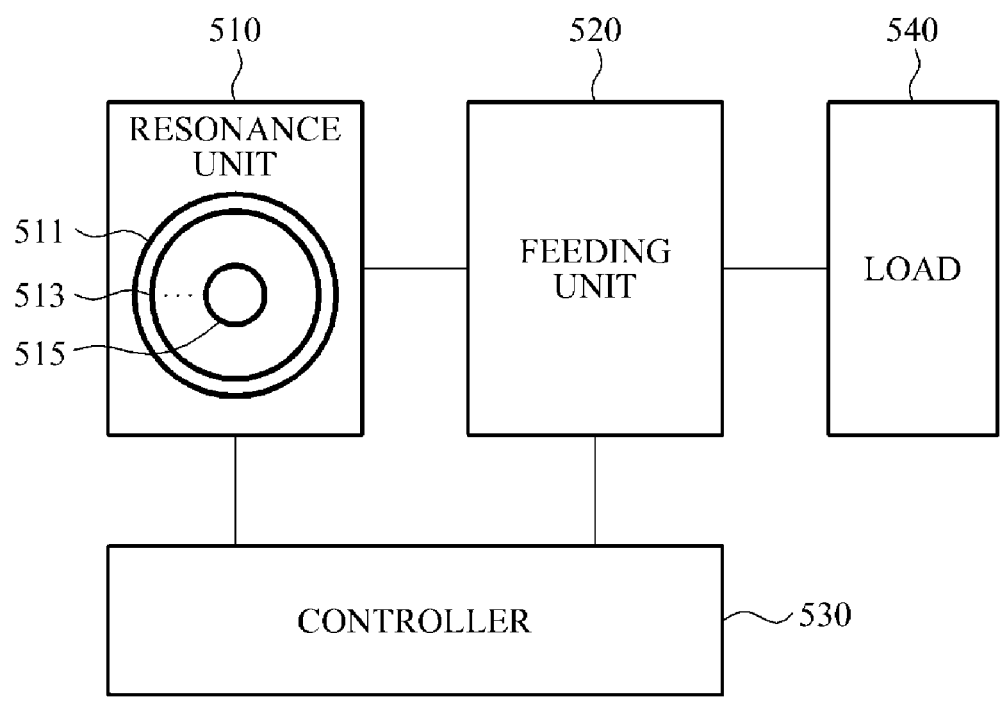
FIG. 5 is a diagram illustrating an example of a wireless power reception apparatus.

FIG. 5 illustrates an example of a wireless power reception apparatus. Referring to FIG. 5, the wireless power reception apparatus includes a resonance unit 510, a feeding unit 520, and a controller 530.

The resonance unit 510 includes resonators 511, 513, and 515. The resonance unit 510 forms a magnetic resonant coupling with a source resonator. When a resonant frequency of the resonators 511, 513, and 515 matches a resonant frequency of the source resonator, the magnetic resonant coupling may occur. The source resonator may include a plurality of resonators.

As another example, when a resonant frequency of at least one of the resonators 511, 513, and 515 matches the resonant frequency of the source resonators, the magnetic resonant coupling may occur. As still another example, when a portion of a resonant frequency band of the resonators 511, 513, and 515 matches a portion of a resonant frequency band of the source resonator, the magnetic resonant coupling may occur.

Each of the resonators 511, 513, and 515 includes a resonant structure in a form of a loop. For example, each of the resonators 511, 513, and 515 may include a variable capacitor of which a capacitance value is adjusted to focus a magnetic field generated by the resonators 511, 513, and 515 on an internal portion of the resonance unit 510.

The resonators 511, 513, and 515 may have different sizes such that the resonators 511, 513, and 515 may be classified into an internal resonator and an external resonator on an identical plane, based on the sizes. For example, the resonator 511 may be classified as an external resonator, when compared to the resonator 513, and the resonator 513 may be classified as an internal resonator. The resonator 511 and the resonator 513 may be positioned on an identical plane. For example, in a system expressed by x, y, and z axes, the resonator 511 and the resonator 513 may be positioned on an identical plane corresponding to an xy plane, a yz plane, or a zx plane. The resonator 511 and the resonator 513 may be positioned to form an identical angle with other generable planes.

In addition, the resonator 513 may be classified as an external resonator, when compared to the resonator 515, and the resonator 515 may be classified as an internal resonator. Furthermore, the resonator 511 may be classified as an external resonator, when compared to the resonator 515, and the resonator 515 may be classified as an internal resonator.

The resonators 511, 513, and 515 may have different sizes such that the resonators 511, 513, and 515 may be classified into an internal resonator, an intermediate resonator, and an external resonator on an identical plane, based on the sizes. For example, the resonator 511 may be classified as an external resonator, the resonator 513 may be classified as an intermediate resonator, and the resonator 515 may be classified as an internal resonator. As another example, when the resonance unit 510 includes at least four resonators, a resonator of a greatest size may be classified as an external resonator, a resonator of a smallest size may be classified as an internal resonator, and remaining resonators may be classified as intermediate resonators.

Each of the resonators 511, 513, and 515 includes the resonant structure in the form of the loop, and the form of the loop may include a form of a polygon or a form of a circle. The resonators 511, 513, and 515 may have identical forms or different forms.

At least one of the resonators 511, 513, and 515 may include at least one capacitor, respectively. Accordingly, a magnitude of the magnetic field generated by the resonator 511, the resonator 513, and the resonator 515 may be adjusted. As another example, by adjusting a capacitance value of the included capacitor, the magnitude of the magnetic field generated by the resonator 511, the resonator 513, and the resonator 515 may be adjusted.

The feeding unit 520 may be connected to one of the resonators 511, 513, and 515 to receive AC power. The feeding unit 520 rectifies the AC power, and transfers the AC power to a load 540. The load 540 is charged using the power rectified by the feeding unit 520. For example, the load 540 may include a chargeable battery, namely, a battery that is capable of storing power.

The controller 530 may determine (i.e., adjust) a capacitance value of the at least one capacitor connected to the at least one of the resonators 511, 513, and 515, based on the magnitude of the magnetic field formed by the resonance unit 510. For example, the controller 530 may determine the capacitance value of the at least one capacitor connected to the at least one of the resonators 511, 513, and 515 so that the magnitude of the magnetic field may increase at a center of the resonance unit 510. When the magnetic field is focused on the center of the resonance unit 510, a magnitude of a magnetic field generated outside the resonance unit 510 may decrease. Accordingly, an effect of the magnetic field on a human positioned close to the resonance unit 510 may be reduced. In addition, a reception efficiency of power to be received from a wireless power transmission apparatus may increase.

The controller 530 may determine a resonator to be connected to the feeding unit 520, among the resonators 511, 513, and 515, so that the magnitude of the magnetic field may increase at the center of the resonance unit 510. The controller 530 may connect at least one capacitor in series between the feeding unit 520 and the at least one of the resonators 511, 513, and 515. The controller 530 may connect at least one capacitor in parallel between the feeding unit 520 and the at least one of the resonators 511, 513, and 515. The controller 530 may connect a plurality of capacitors in series and parallel between the feeding unit 520 and the at least one of the resonators 511, 513, and 515. Although three resonators 511, 513, and 515 are used in the example of FIG. 5, the resonance unit 510 may include at least three resonators.

Figure 6:
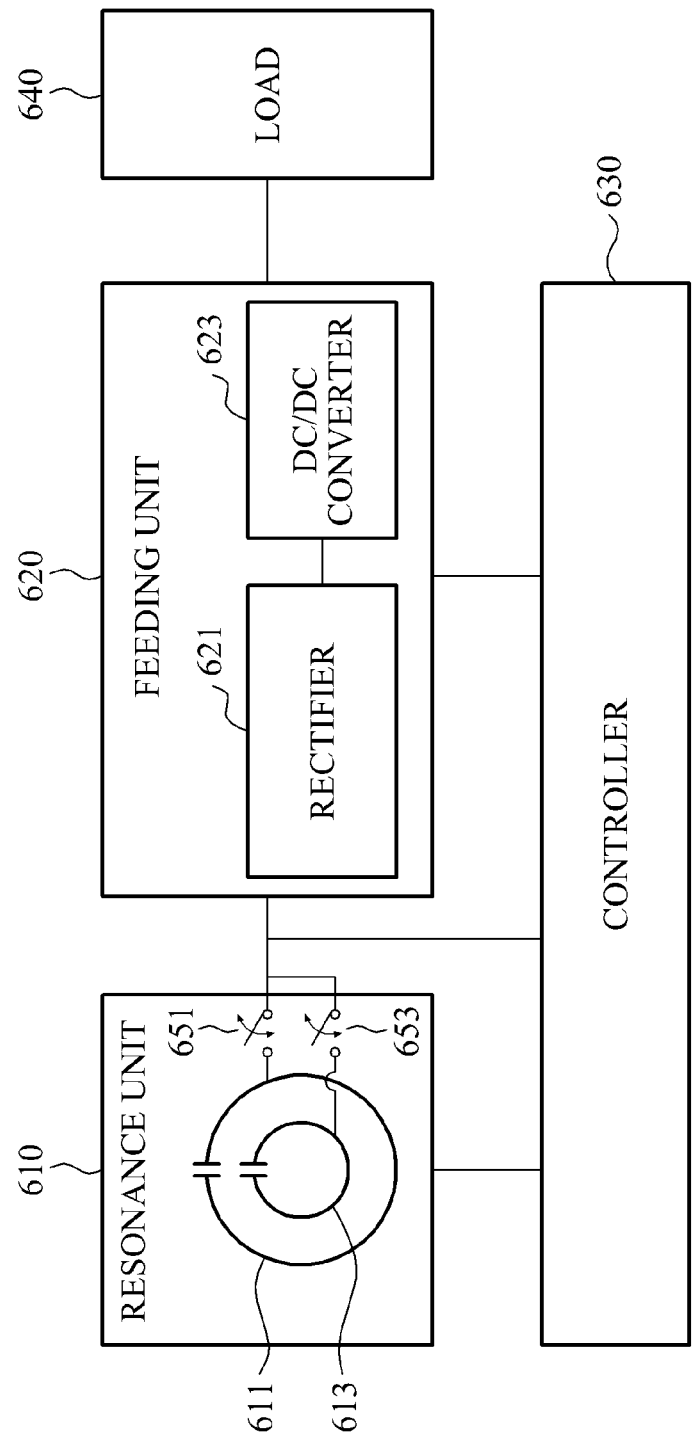
FIG. 6 is a diagram illustrating another example of a wireless power reception apparatus.

FIG. 6 illustrates another example of a wireless power reception apparatus. Referring to FIG. 6, the wireless power reception apparatus includes a resonance unit 610, a feeding unit 620, and a controller 630.

The resonance unit 610 includes resonators 611 and 613. The resonance unit 610 forms a magnetic resonant coupling with a source resonator. When a resonant frequency of the resonators 611 and 613 matches a resonant frequency of the source resonator, the magnetic resonant coupling may occur. The source resonator may include a plurality of resonators.

Each of the resonators 611 and 613 includes a resonant structure in a form of a loop. For example, each of the resonators 611 and 613 may include a variable capacitor of which a capacitance value is adjusted to focus a magnetic field generated by the resonators 611 and 613 on an internal portion of the resonance unit 610.

The resonators 611 and 613 may have different sizes such that the resonators 611 and 613 may be classified into an internal resonator and an external resonator on an identical plane, based on the sizes. For example, the resonator 611 may be classified as an external resonator, when compared to the resonator 613, and the resonator 613 may be classified as an internal resonator. The resonator 611 and the resonator 613 may be positioned on an identical plane. For example, in a system expressed by x, y, and z axes, the resonator 611 and the resonator 613 may be positioned on an identical plane corresponding to an xy plane, a yz plane, or a zx plane. The resonator 611 and the resonator 613 may be positioned to form an identical angle with other generable planes.

Each of the resonators 611 and 613 includes the resonant structure in the form of the loop, and the form of the loop may include a form of a polygon or a form of a circle. The resonators 611 and 613 may have identical forms or different forms.

At least one of the resonators 611 and 613 may include at least one capacitor, respectively. Accordingly, a magnitude of the magnetic field generated by the resonator 611 and the resonator 613 may be adjusted. As another example, by adjusting a capacitance value of the included capacitor, the magnitude of the magnetic field generated by the resonator 611 and the resonator 613 may be adjusted.

The resonance unit 610 includes the switches 651 and 653. The switches 651 and 653 may connect the resonators 611 and 613, respectively, to the feeding unit 620. The controller 630 may determine a switch to be used to connect the feeding unit 620 and a respective one of the resonators 611 and 613, among the switches 651 and 653, based on the magnitude of the magnetic field formed by the resonance unit 610. For example, the controller 630 may control an operation of the switch 653 to connect the resonator 613 to the feeding unit 620, so that the magnitude of the magnetic field in the internal portion of the resonance unit 610 may increase. As another example, the controller 630 may control an operation of the switch 651 to connect the resonator 611 to the feeding unit 620, so that the magnitude of the magnetic field between the resonator 613 and the resonator 611 may increase.

The feeding unit 620 may be connected to one of the resonators 611 and 613 to receive AC power. The feeding unit 620 rectifies the AC power, and transfer the AC power to a load 640. The load 640 is charged using the power rectified by the feeding unit 620. For example, the load 640 may include a chargeable battery, namely, a battery capable of storing power.

The feeding unit 620 includes a rectifier 621 and a DC/DC converter 623. The rectifier 621 rectifies the received AC power into DC power. For example, the rectifier 621 may include various types of diodes.

The DC/DC converter 623 may convert a voltage level of the DC power rectified by the rectifier 621 into a rated voltage level of the load 640. As another example, the DC/DC converter 623 may convert the voltage level of the rectified DC power into a voltage level that variably depends on a charging state of the load 640.

The controller 630 may determine (i.e., adjust) a capacitance value of the at least one capacitor connected to the at least one of the resonators 611 and 613, based on the magnitude of the magnetic field formed by the resonance unit 610. For example, the controller 630 may determine the capacitance value of the at least one capacitor connected to the at least one of the resonators 611 and 613 so that the magnitude of the magnetic field may increase at a center of the resonance unit 610.

The controller 630 may adjust a distance between the resonators 611 and 613 based on the magnitude of the magnetic field formed by the resonance unit 610, to focus the magnetic field on the internal portion of the resonance unit 610. For example, the controller 630 may adjust a position of the resonator 611 or the resonator 613, using a moving pole connected to each of the resonator 611 and the resonator 613, thereby adjusting the distance between the resonator 611 and the resonator 613. Although the switches 651 and 653 are included in the resonance unit 610 in the example of FIG. 6, the switches 651 and 653 may be included in the wireless power reception apparatus as separate elements from the resonance unit 610.

Figure 7:
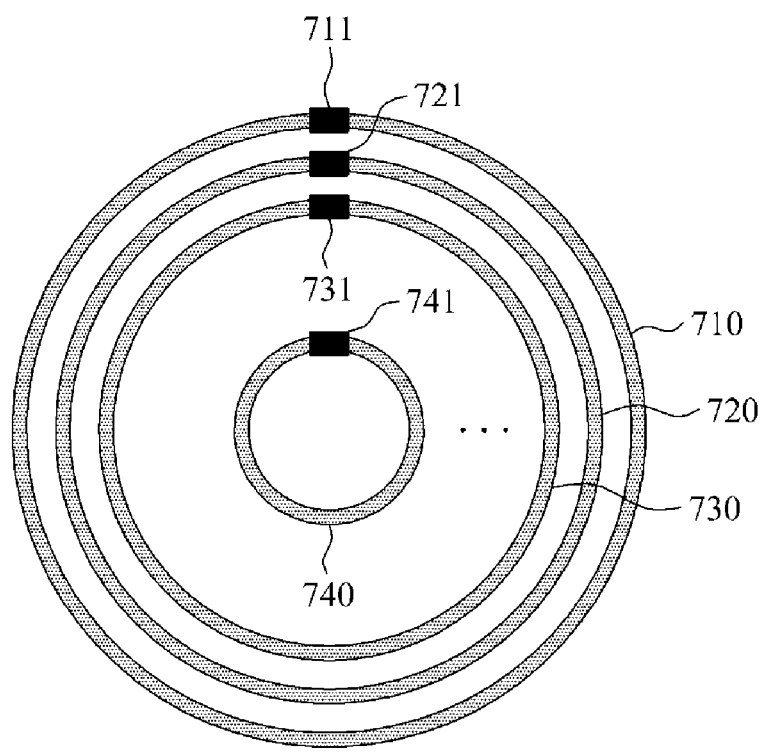
FIG. 7 is a diagram illustrating an example of a resonance unit including a plurality of resonators.

FIG. 7 illustrates an example of a resonance unit including a plurality of resonators. Referring to FIG. 7, the resonance unit is provided in a structure of resonators 710, 720, 730, and 740. Accordingly, a magnetic field may be focused on a center of the resonators 710, 720, 730, and 740.

The resonators 710, 720, 730, and 740 constitute the single resonance unit. Capacitors 711, 721, 731, and 741 that are capable of adjusting a focus level of the magnetic field are connected to the resonators 710, 720, 730, and 740, respectively. Each of the capacitors 711, 721, 731, and 741 may have a fixed capacitance or a variable capacitance. The magnetic field may be adjusted by adjusting a distance that separates each pair of the resonators 710, 720, 730, and 740 and a capacitance of at least one of the corresponding capacitors 711, 721, 731, and 741.

Although the capacitors 711, 721, 731, and 741 are connected to the resonators 710, 720, 730, and 740, respectively, in the example of FIG. 7, a capacitor may be connected to one of the resonators 710, 720, 730, and 740, as another example. As still another example, a capacitor may not be connected to at least one of the resonators 710, 720, 730, and 740. A shape of each of the resonators 710, 720, 730, and 740 may include a polygon, for example, a circle, a triangle, a rectangle, a pentagon, of a combination thereof.

Figure 8:
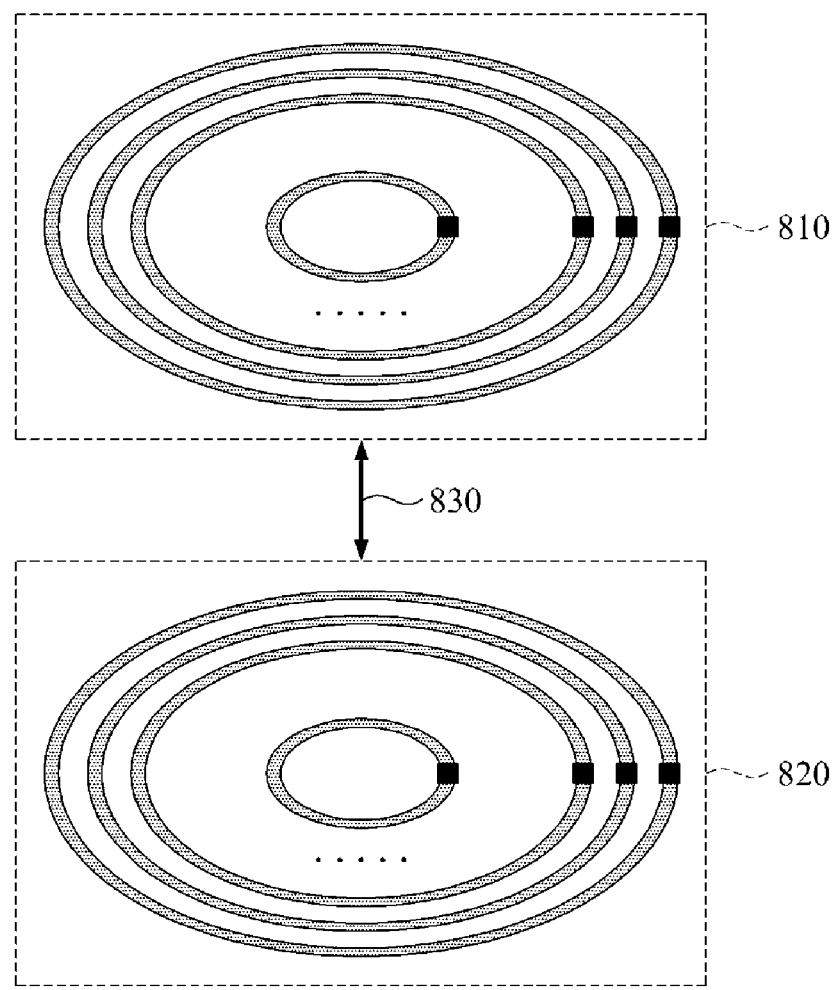
FIG. 8 is a diagram illustrating an example of a resonance unit of a wireless power transmission apparatus and a resonance unit of a wireless power reception apparatus in a wireless power transmission system.

FIG. 8 illustrates an example of a resonance unit 810 of a wireless power transmission apparatus and a resonance unit 820 of a wireless power reception apparatus in a wireless power transmission system. Referring to FIG. 8, the resonance unit 810 of the wireless power transmission apparatus includes a plurality of resonators. By adjusting a structure formed by the resonators and a capacitance value of a capacitor connected to at least one of the resonators, a magnetic field may be focused on a center of the resonance unit 810.

The resonance unit 820 of the wireless power reception apparatus includes a plurality of resonators. By adjusting a structure formed by the resonators and a capacitance value of a capacitor connected to each of the resonators, a magnetic field may be focused on a center of the resonance unit 820.

When the resonance unit 810 and the resonance unit 820 are aligned and AC power is supplied to the resonance unit 810 at a resonant frequency, a magnetic resonant coupling 830 may occur. The power may be transferred from the resonance unit 810 to the resonance unit 820.

As another example, the resonance unit 810 or the resonance unit 820 may be formed in a structure in which a magnetic field is focused.

In order to reduce a magnitude of a magnetic field formed outside the resonance unit 810 and the resonance unit 820, rather than between the resonance unit 810 and the resonance unit 820, a distance between each pair of the resonators, a capacitance value of at least one capacitor connected to at least one of the resonators, respectively, and a number of the resonators may be adjusted. In addition, when a resonator to be used to feed is determined, the magnitude of the magnetic field generated outside may decrease. Furthermore, by adjusting a width and a thickness of a resonator, the magnitude of the magnetic field generated outside may decrease.

Figure 9:
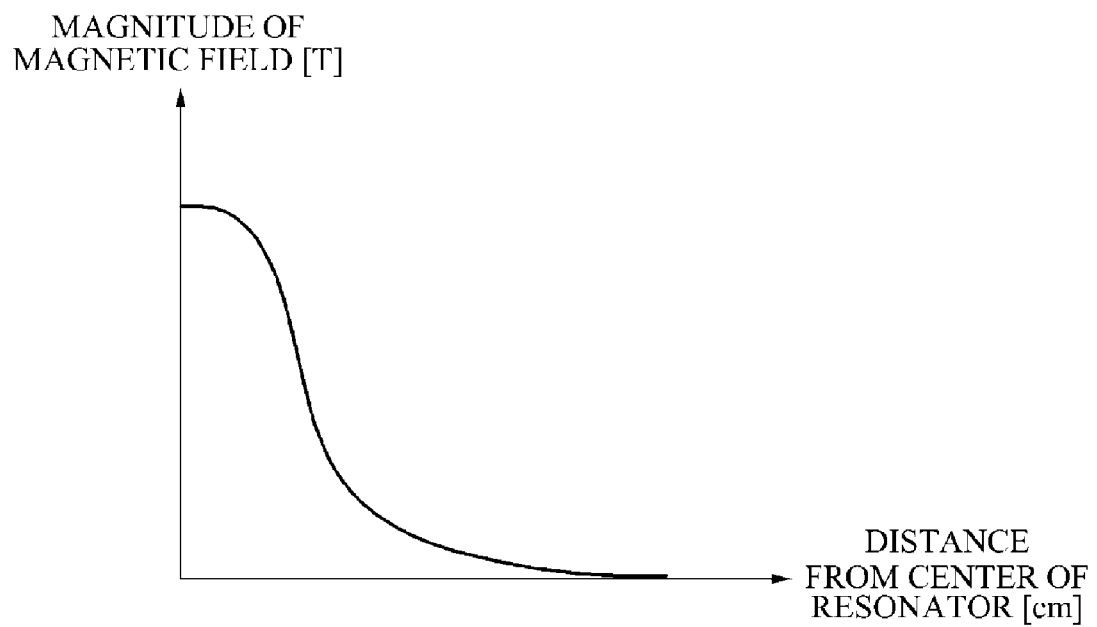
FIG. 9 is a graph illustrating an example of a magnitude of a magnetic field formed by a resonance unit.

FIG. 9 illustrates an example of a magnitude of a magnetic field formed by a resonance unit. Referring to FIG. 9, in view of a structure of a plurality of resonators in the resonance unit, a feeding unit connected to a resonator, and a capacitance value of a capacitor connected to a resonator, the magnitude of the magnetic field is strongest at a center of the resonance unit. As a distance from the center of the resonance unit increases, the magnitude of the magnetic field decreases. As the distance from the center of the resonance unit decreases, the magnitude of the magnetic field increases.

Figure 10A:
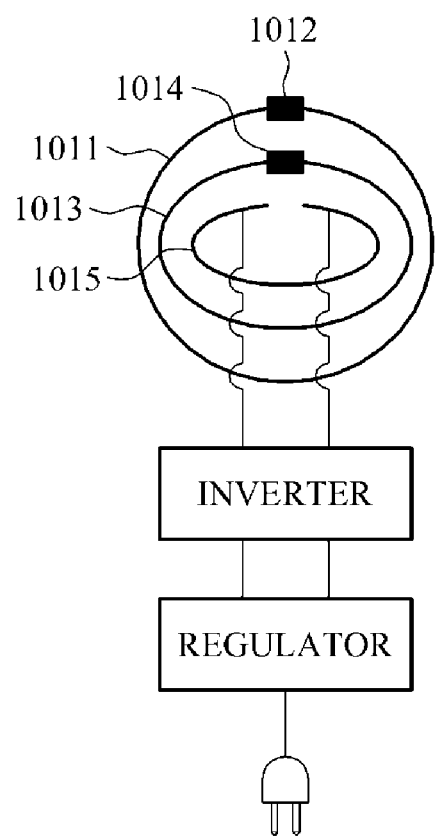

FIGS. 10A through 10D illustrate examples of various connection structures between a capacitor and a resonator of a wireless power transmission apparatus. Referring to FIG. 10A, a resonance unit includes resonators 1011, 1013, and 1015. The resonator 1011 includes a capacitor 1012, and the resonator 1013 includes a capacitor 1014. A capacitor is not connected to the resonator 1015, rather a feeding unit including a regulator and an inverter is connected to the resonator 1015. As another example, the feeding unit may be connected to the resonator 1011 or the resonator 1013.

Figure 10B:
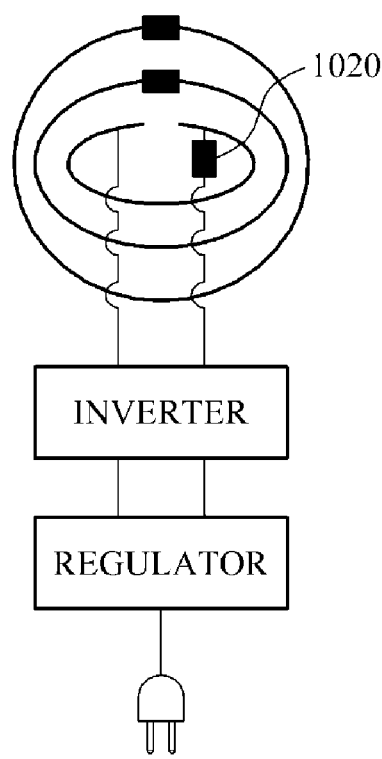

Referring to FIG. 10B, a capacitor 1020 is connected in series to the feeding unit and the resonator 1015.

Figure 10C:
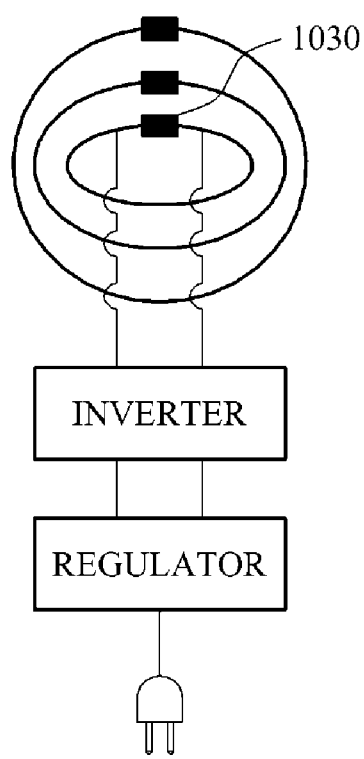

Referring to FIG. 10C, a capacitor 1030 is connected in parallel to the feeding unit and the resonator 1015.

Referring to FIG. 10D, a capacitor 1040 is connected in parallel to the feeding unit and the resonator 1015, and a capacitor 1050 is connected in series to the feeding unit and the resonator 1015.

Figure 11A:
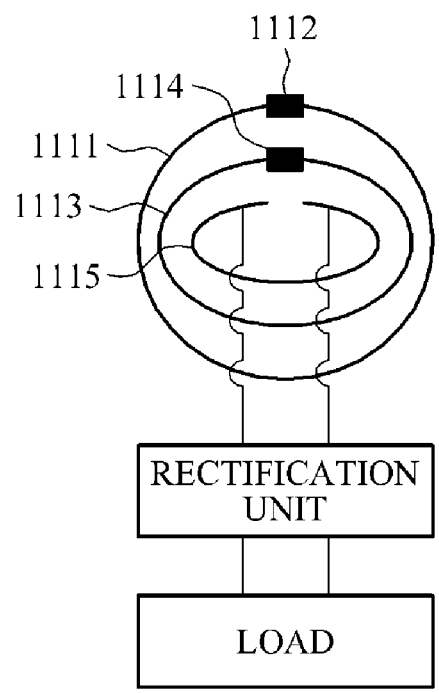
FIGS. 11A through 11D are diagrams illustrating examples of various connection structures between a capacitor and a resonator of a wireless power reception apparatus.

FIGS. 11A through 11D illustrate examples of various connection structures between a capacitor and a resonator of a wireless power reception apparatus. Referring to FIG. 11A, a resonance unit includes resonators 1111, 1113, and 1115. The resonator 1111 includes a capacitor 1112, and the resonator 1113 includes a capacitor 1114. A capacitor is not connected to the resonator 1115, rather a feeding unit, including a rectification unit, and a load are connected to the resonator 1115. As another example, the feeding unit may be connected to the resonator 1111 or the resonator 1113.

Figure 11B:
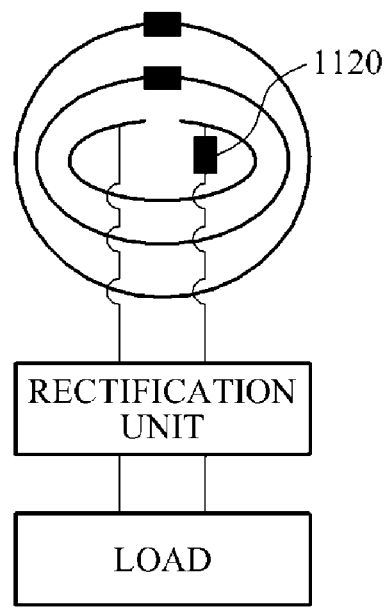

Referring to FIG. 11B, a capacitor 1120 is connected in series to the feeding unit and the resonator 1115.

Figure 11C:
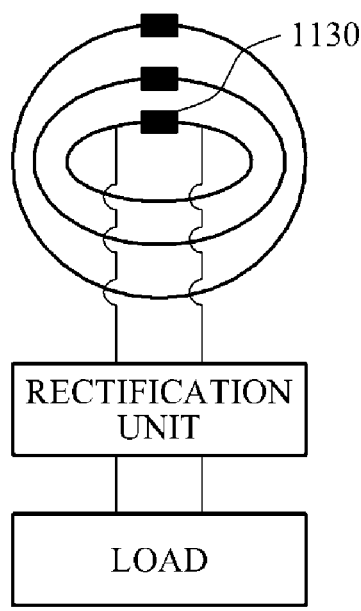

Referring to FIG. 11C, a capacitor 1130 is connected in parallel to the feeding unit and the resonator 1115.

Figure 11D:
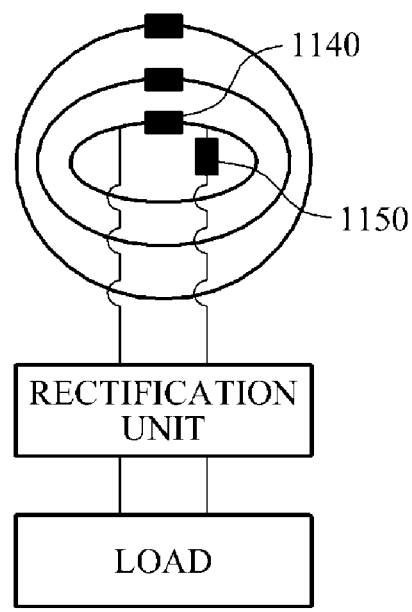

Referring to FIG. 11D, a capacitor 1140 is connected in parallel to the feeding unit and the resonator 1115, and a capacitor 1150 is connected in series to the feeding unit and the resonator 1115.

The examples of the wireless power transmission apparatus and the wireless power reception apparatus, using a resonator having a function to focus a magnetic field generated by a resonance unit on a center of the resonance unit, may increase a wireless power transmission efficiency between a source resonator and a target resonator. Also, the examples of the wireless power transmission apparatus and the wireless power reception apparatus may minimize an amount of the magnetic field that leaks into an external portion of the resonance unit.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmission apparatus comprising:
a resonance unit comprising resonators and configured to form a magnetic resonant coupling with another resonator;
a feeding unit configured to transmit alternating current (AC) power to one of the resonators; and
a controller configured to determine a value of a capacitor connected to one of the resonators, based on a magnitude of a magnetic field formed by the resonance unit.

2. The apparatus of claim 1, wherein each of the resonators is in a form of a loop, and comprises a variable capacitor of which a value is adjusted to focus the magnetic field on an internal portion of the resonance unit.

3. The apparatus of claim 1, wherein the resonators have different sizes and are classified into an internal resonator and an external resonator on a plane, based on the sizes.

4. The apparatus of claim 1, wherein the resonators have different sizes and are classified into an internal resonator, an intermediate resonator, and an external resonator on a plane, based on the sizes.

5. The apparatus of claim 1, wherein each of the resonators is in a form of a loop, the form of the loop comprising a form of a polygon or a form of a circle.

6. The apparatus of claim 1, wherein:
each of at least one of the resonators comprises a variable capacitor; and
the controller is configured to determine a value of the variable capacitor of each of the at least one of the resonators, based on the magnitude of the magnetic field formed by the resonance unit.

7. The apparatus of claim 1, wherein the capacitor is connected in series between the feeding unit and at least one of the resonators.

8. The apparatus of claim 1, wherein the capacitor is connected in parallel between the feeding unit and at least one of the resonators.

9. The apparatus of claim 1, further comprising:
switches configured to connect the respective resonators and the feeding unit,
wherein the controller is further configured to determine a switch to be used to connect the feeding unit and a respective one of the resonators, among the switches, based on the magnitude of the magnetic field formed by the resonance unit.

10. The apparatus of claim 1, wherein the feeding unit comprises:
a regulator configured to adjust a voltage level of power to be supplied, based on a charging capacity of a wireless power reception apparatus; and
an inverter configured to convert the power of the adjusted voltage level to the AC power, using a resonant frequency of the resonators.

11. The apparatus of claim 1, wherein the controller is further configured to:
adjust a distance between the resonators based on the magnitude of the magnetic field formed by the resonance unit, to focus the magnetic field on an internal portion of the resonance unit.

12. A wireless power reception apparatus comprising:
a resonance unit comprising resonators and configured to form a magnetic coupling with another resonator;
a feeding unit configured to receive alternating current (AC) power from one of the resonators; and
a controller configured to determine a value of a capacitor connected to one of the resonators, based on a magnitude of a magnetic field formed by the resonance unit.

13. The apparatus of claim 12, wherein each of the resonators is in a form of a loop, and comprises a variable capacitor of which a value is adjusted to focus the magnetic field on an internal portion of the resonance unit.

14. The apparatus of claim 12, wherein the resonators have different sizes and are classified into an internal resonator and an external resonator on a plane, based on the sizes.

15. The apparatus of claim 12, wherein the resonators have different sizes and are classified into an internal resonator, an intermediate resonator, and an external resonator on a plane, based on the sizes.

16. The apparatus of claim 12, further comprising:
    switches configured to connect the respective resonators and the feeding unit,
    wherein the controller is further configured to determine a switch to be used to connect the feeding unit and a respective one of the resonators, among the switches, based on the magnitude of the magnetic field formed by the resonance unit.

17. The apparatus of claim 12, wherein the feeding unit comprises:
    a rectifier configured to rectify the AC power into direct current (DC) power; and
    a DC-to-DC (DC/DC) converter configured to convert a voltage level of the DC power into a rated voltage level of a load.

18. An apparatus comprising:
    resonators configured to form a resonant coupling with another resonator; and
    a controller configured to determine a value of a capacitor connected to one of the resonators, based on a magnetic field generated by the resonators.

19. The apparatus of claim 18, wherein the controller is configured to:
    determine the value of the capacitor so that a magnitude of the magnetic field increases at a center of the resonators.

20. The apparatus of claim 18, wherein the controller is further configured to:
    determine a distance between the resonators so that a magnitude of the magnetic field increases at a center of the resonators.

* * * * *